US009996349B2

(12) United States Patent
Coneski et al.

(10) Patent No.: US 9,996,349 B2
(45) Date of Patent: Jun. 12, 2018

(54) CLEARING SPECIFIED BLOCKS OF MAIN STORAGE

(71) Applicant: International Business Machines Corporation, Armonk, NY (US)

(72) Inventors: Anthony F. Coneski, Newburgh, NY (US); Beth A. Glendening, Poughkeepsie, NY (US); Dan F. Greiner, San Jose, CA (US); Peter G. Sutton, Lagrangeville, NY (US); Scott B. Tuttle, Staatsburg, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/606,130

(22) Filed: Jan. 27, 2015

(65) Prior Publication Data

US 2016/0216965 A1    Jul. 28, 2016

(51) Int. Cl.
*G06F 9/30* (2018.01)
*G06F 9/50* (2006.01)
*G06F 12/02* (2006.01)
*G06F 3/06* (2006.01)
*G06F 13/00* (2006.01)

(52) U.S. Cl.
CPC .......... *G06F 9/30043* (2013.01); *G06F 3/065* (2013.01); *G06F 3/0608* (2013.01); *G06F 3/0617* (2013.01); *G06F 3/0652* (2013.01); *G06F 3/0683* (2013.01); *G06F 9/5077* (2013.01); *G06F 12/023* (2013.01); *G06F 13/00* (2013.01); *G06F 2212/1044* (2013.01)

(58) Field of Classification Search
None
See application file for complete search history.

(56) References Cited

U.S. PATENT DOCUMENTS

| 4,399,506 A | * | 8/1983 | Evans | G06F 12/0822 |
| | | | | 711/143 |
| 5,442,802 A | * | 8/1995 | Brent | G06F 13/28 |
| | | | | 709/213 |
| 5,526,484 A | * | 6/1996 | Casper | G06F 13/126 |
| | | | | 709/237 |

(Continued)

OTHER PUBLICATIONS

IBM Technical Disclosure: Latency Optimized Interrupt to S/390 Parallel Processors; TDB-ACC-No. NN971061 vol. No. 40; Issue No. 10; Page No. 61-64; Publication-Date: Oct. 1, 1997; Cross Reference: 0018-8689-40-10-61.*

(Continued)

*Primary Examiner* — Reginald G Bragdon
*Assistant Examiner* — Paul M Knight
(74) *Attorney, Agent, or Firm* — Alexa L. Ashworth; A. Imtiaz Billah

(57) ABSTRACT

Embodiments of the present invention provide systems and methods for clearing specified blocks of main storage. In one embodiment, an EADM start subchannel is executed. The instructions of the execution of the EADM start subchannel may include a SAP receiving an ADM request block, which specifies a main-storage-clearing operation command. The address and size of a block of main memory to be cleared by the SAP is specified in an MSB designated by the ADM request block.

20 Claims, 4 Drawing Sheets

(56) References Cited

U.S. PATENT DOCUMENTS

| | | | | |
|---|---|---|---|---|
| 5,535,369 | A | * | 7/1996 | Wells .................... G06F 3/0601 |
| | | | | 711/103 |
| 7,392,269 | B2 | * | 6/2008 | Chauvel ............. G06F 9/30134 |
| | | | | 707/700 |
| 7,958,327 | B2 | | 6/2011 | Arimilli et al. |
| 8,095,758 | B2 | | 1/2012 | Arimilli et al. |
| 8,417,916 | B2 | * | 4/2013 | Greiner ................ G06F 9/3004 |
| | | | | 711/156 |
| 2006/0282564 | A1 | | 12/2006 | Casper et al. |
| 2007/0204126 | A1 | * | 8/2007 | Bangalore ............ G06F 3/0613 |
| | | | | 711/170 |
| 2010/0186014 | A1 | | 7/2010 | Vaghani et al. |
| 2012/0317386 | A1 | * | 12/2012 | Driever .............. G06F 12/0246 |
| | | | | 711/166 |
| 2015/0347186 | A1 | | 12/2015 | Truong et al. |

OTHER PUBLICATIONS

Cell GC: Using the Cell Synergistic Processor as a Garbage Collection Coprocessor by Cher; IBM 2008 (Year: 2008).*
GPUs as an Opportunity for Offloading Garbage Collection by Maas; ACM 2012 (Year: 2012).*
U.S. Appl. No. 15/014,063, filed Feb. 3, 2016, Entitled "Clearing Specified Blocks of Main Storage".
List of IBM Patents or Patent Applications Treated As Related, dated Feb. 3, 2016, 2 pages.
Coneski et al., "Clearing Specified Blocks of Main Storage", U.S. Appl. No. 15/790,092, filed Oct. 23, 2017, 15 pages.
Coneski et al., "Clearing Specified Blocks of Main Storage", U.S. Appl. No. 15/790,097, filed Oct. 23, 2017, 15 pages.
Appendix P—List of IBM Patents or Patent Applications Treated as Related, Filed herewith, 2 Pages.

* cited by examiner

CLEARING SPECIFIED BLOCKS OF MAIN STORAGE

BACKGROUND OF THE INVENTION

The present invention relates generally to the field of data processing operations, and more particularly to clearing operations for specified blocks of main storage.

The amount of main memory on a computing device is important because it determines how many programs may be executed at one time and how much data may be readily available to a program. One known method of clearing storage is the use of Move Long (MVCL) operation, or analogous operations Move Long Extended (MVCLE) and Move Long Unicode (MVCLU). Execution of these instructions is synchronously performed by a central processing unit (CPU); however, the execution of these instructions may reduce the overall throughput of the CPU.

SUMMARY

According to one embodiment of the present invention, a method in a data processing system for clearing blocks of main storage is provided, the method comprising: determining, by a processor, from an instruction stream, an extended asynchronous data mover (EADM) start subchannel instruction; and executing, by the processor, the EADM start subchannel instruction, the executing comprising: notifying, by the processor, a system assist processor (SAP); receiving, by the SAP, an asynchronous data mover (ADM) request block; determining, by the SAP, whether the ADM request block specifies a main-storage-clearing operation command; responsive to determining the ADM request block specifies the main-storage-clearing operation command, obtaining one or more move specification blocks (MSBs), wherein an address associated with the one or more MSBs is designated by the ADM request block; and sending the ADM request block; determining, by the SAP, based on the one or more MSBs, an address and a size of a main storage block to clear; and responsive to determining the address and the size of the main storage block, clearing, by the SAP, the main storage block.

DETAILED DESCRIPTION

The growth of cloud computing, analytics, and big data brings an increased need for efficient processes to control the moving and clearing of data, such as blocks of memory. Embodiments of the present invention provide methods and systems for increasing the efficiency of operation of a CPU by off-loading the main storage clearing operations to a separate I/O processor in the data processing environment, such as the extended asynchronous data mover facility (EADMF).

Figure 1:
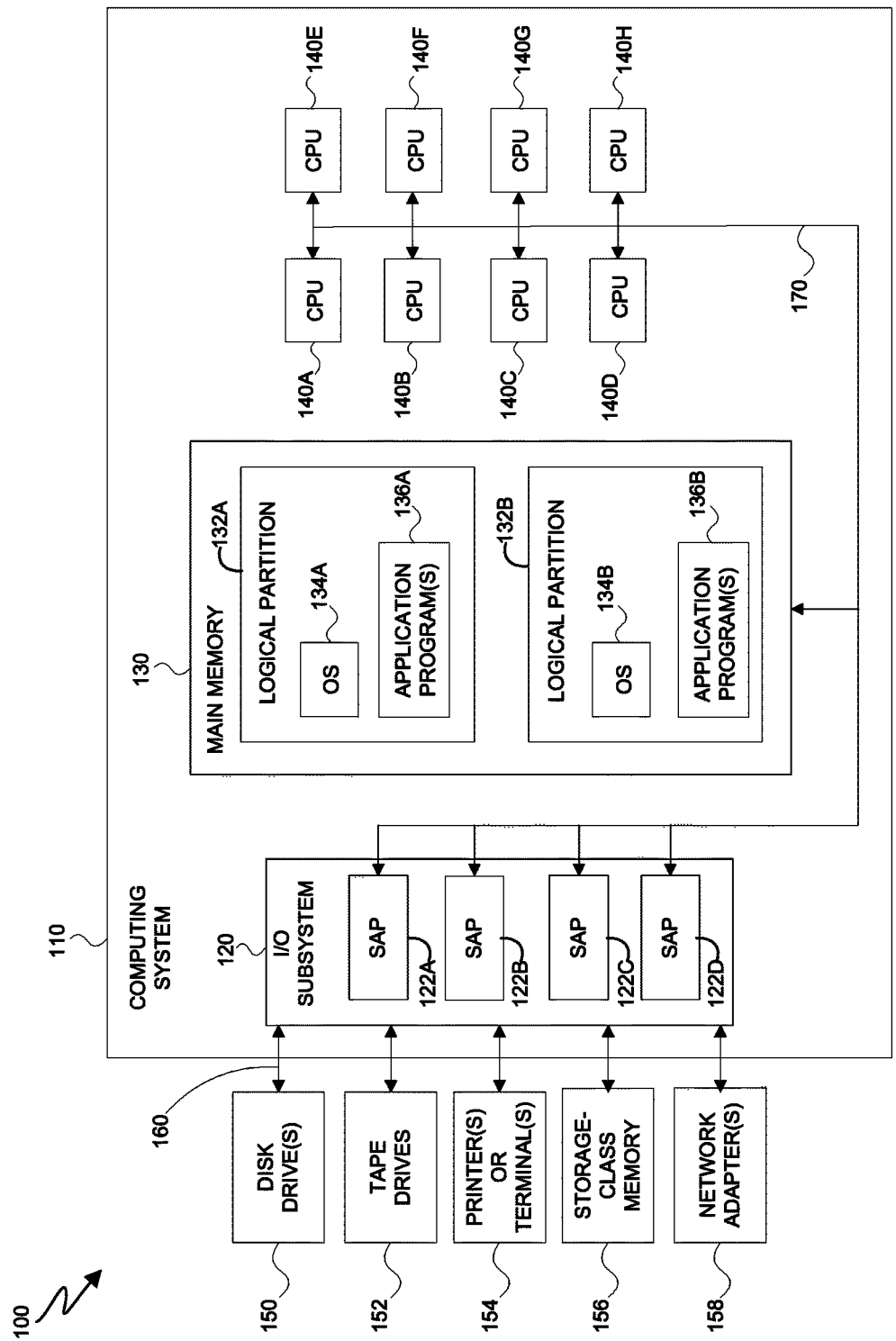
FIG. 1 depicts a functional block diagram of a computing environment, in accordance with an embodiment of the present invention.

The present invention will now be described in detail with reference to the Figures. FIG. 1 depicts a functional block diagram illustrating a computing environment, generally designated 100, in accordance with an embodiment of the present invention. Modifications to environment 100 may be made by those skilled in the art without departing from the scope of the invention as recited by the claims. In an exemplary embodiment, environment 100 includes I/O devices (i.e., disk drive(s) 150, tape drives 152, printer(s) or terminal(s) 154, storage-class memory 156, and network adaptor(s) 158) and computing system 110. The I/O devices are connected to I/O subsystem 120 via I/O device connection 160.

Computing system 110 includes I/O subsystem 120, main memory 130, and CPUs 140A-H, all interconnected by interconnection bus 170. In this exemplary embodiment, I/O subsystem 120 includes system assist processors (SAPs) 122A-D. SAPs 122A-D are each processing units which run the channel subsystem to control input/output operations. SAPs 122A-D communicate with one or more of CPUs 140A-H by means of a shared bus, such as interconnection bus 170, and by means of shared structures in memory. Among other operations, SAPs 122A-D perform memory clearing operations of main memory 130.

CPUs 140A-H may execute instructions of operating systems (OS) 134A and 134B. Operating systems may include the z/OS®, z/VM, z/VSE, zLinux, or TPF operating systems available from International Business Machines of Armonk, N.Y., or in other embodiments, CPUs 140A-H may execute instructions of other operating systems. OS 134A and 134B each issue start subchannel (SSCH) instructions, which are issued by OS 134A and 134B to start EADMF operations (discussed further below).

In this exemplary embodiment, main memory 130 is divided into multiple logical configurations representing virtualized computing systems. The configurations comprise a first level, including logical partitions (LPARs) 132A-B. Each of LPARs 132A and 132B run OS 134A and 134B, respectively, and application program(s) 136A and 136B, respectively. In some embodiments, main memory 130 may be divided up into logical configurations comprising up to one hundred LPARs. A second level (not depicted in FIG. 1) represents an operating system, such as z/VM, which provides its own second-level configurations. Thousands of virtual machines may exist under one or more z/VM partitions.

In this exemplary embodiment, CPUs 140A-H and the I/O devices are apportioned to an individual LPAR. For example, CPUs 140A-D may be allocated to LPAR 132A while CPUs 140E-H may be allocated to LPAR 132B. The plurality of I/O devices in FIG. 1 may be apportioned between LPARs 132A and 132B in a similar manner as CPUs 140A-H. In other embodiments, CPUs and I/I devices may be shared by one or more LPARs.

Figure 2:
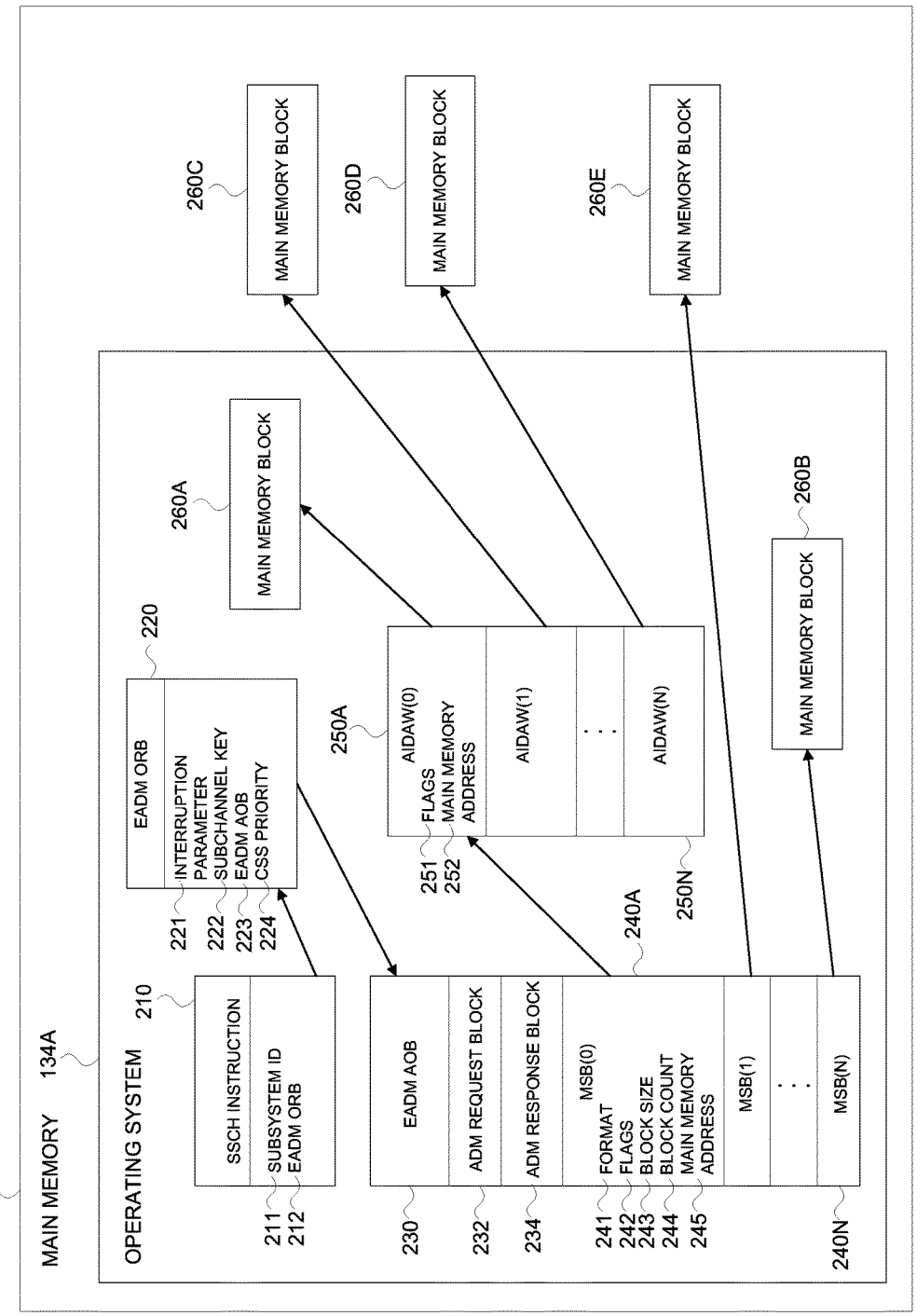
FIG. 2 depicts the interrelations of the storage structures used in an EADMF main-storage-clearing operation, in accordance with an embodiment of the present invention.

FIG. 2 depicts the interrelations of the storage structures used in an EADMF main-storage-clearing operation, in accordance with an embodiment of the present invention. While this embodiment depicts a particular set of fields in each storage structure, in other embodiments, additional fields may be depicted in each storage structure.

Start subchannel instruction 210 is located in main memory 130 of operating system 134A, and is executed by a CPU, such as CPUs 140A-H (not depicted in FIG. 2). In this exemplary embodiment, start subchannel instruction 210 includes two operands: subsystem ID 211 and EADM operation request block (ORB) 212. The operand subsystem ID 211 designates an asynchronous data mover (ADM) subchannel to be used to perform the clearing operation, while the operand EADM ORB 212 designates the address of EADM ORB 220.

In this exemplary embodiment, EADM ORB 220 contains the fields: interruption parameter 221, subchannel key 222, EADM asynchronous operation block (AOB) address 223, and channel subsystem (CSS) priority 224. EADM AOB address 223 identifies the location of EADM AOB 230, which includes ADM request block 232, ADM response block 234, and one or more move specification blocks (MSBs) 240A-N.

In this exemplary embodiment, MSBs 240A-N each contain the fields: format 241, flags 242, block size 243, block count 244, and main memory address 245. Flags 242 contained within MSBs 240A-N may directly designate the block of main storage to be cleared (e.g., main memory blocks 260B and 260E of FIG. 2). The list of block addresses to be cleared does not have to be contiguous. For example, one contiguous block of addresses of storage to be cleared may be specified, or a list of non-contiguous addresses of storage to be cleared may be listed. If the blocks of storage to be transferred for a clear operation are not contiguous in main storage, a new MSB may be used, or the MSB may use indirect addressing by specifying a list of one or more asynchronous-indirect-address words (AIDAWs) 250A-N to designate the non-continuous blocks. In this exemplary embodiment, each of AIDAWs 250A-N contain the fields: flags 251 and main memory address 252. Flags 251 contained within AIDAWs 250A-N may either directly designate the block(s) of main memory to be cleared (e.g., main memory blocks 260A, 260C, and 260D of FIG. 2), or flags 251 may designate the address of another AIDAW so that one or more groups of AIDAWs 250A-N may be linked together. EADM operations, once initiated, are performed by firmware running on a SAP and operate asynchronously from program instructions that are executed by a CPU.

As examples to which the invention has particular relevance, see "z/Architecture Principles of Operation," IBM® Publication No. SA22-7832-09 and U.S. patent application Ser. No. 13/157,729, filed on Jun. 10, 2011, which are incorporated herein by reference in their entirety.

Figure 3A:
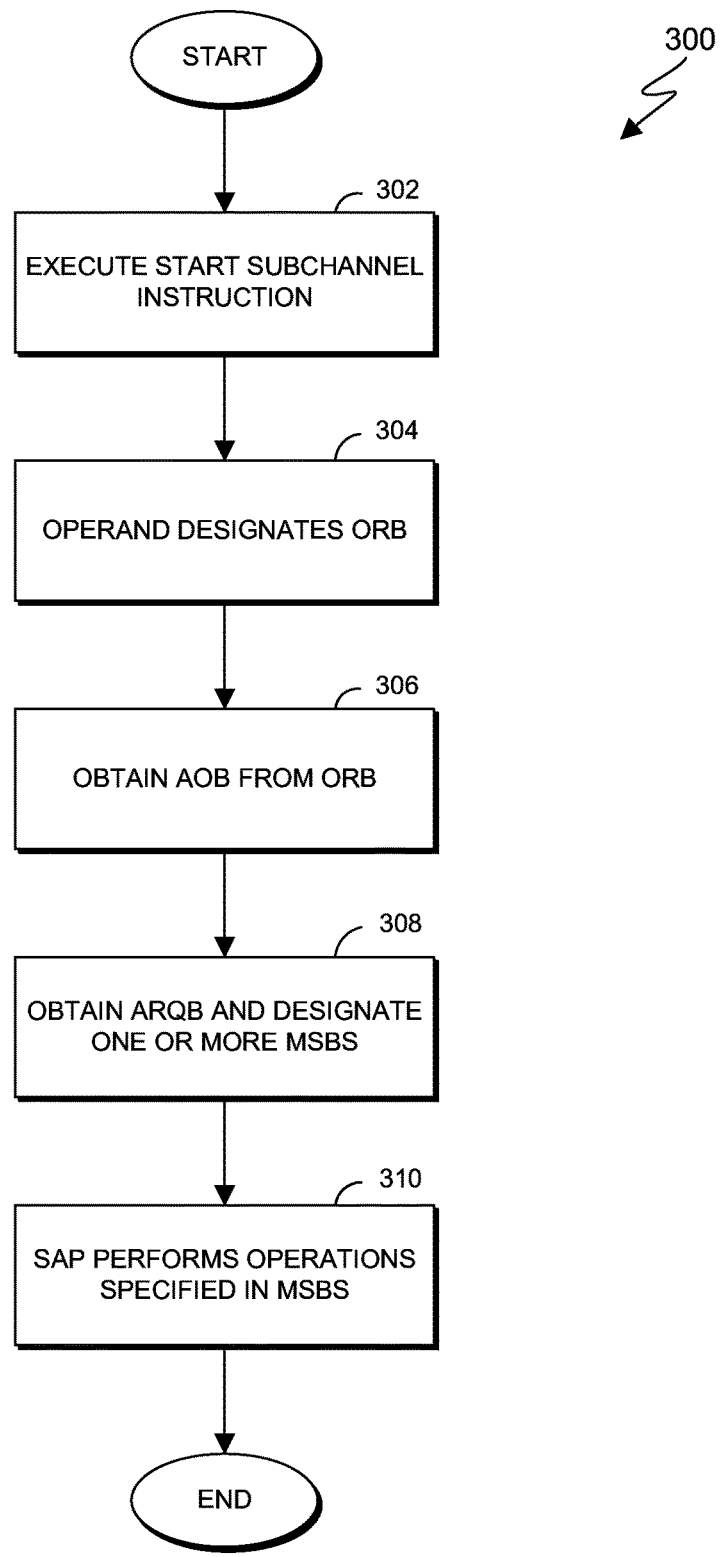
FIG. 3A depicts a flowchart illustrating operational steps for clearing specified blocks of main storage, in accordance with an embodiment of the present invention.

FIG. 3A depicts flowchart 300 illustrating operational steps for clearing specified blocks of main storage, in accordance with an embodiment of the present invention.

In step 302, an I/O start operation is initiated by the CPU, executing an EADM start subchannel instruction issued by operating system 134A (FIG. 2). In this exemplary embodiment, the executed EADM start subchannel instruction designates an ADM subchannel and an EADM ORB, such as EADM ORB 220.

In step 304, an operand of the EADM start subchannel instruction is received, which designates the location of EADM ORB 220 (FIG. 2).

In step 306, the address of EADM AOB 230 to be implemented is obtained from EADM ORB 220. In step 308, one or more available SAPs, such as one or more of SAPs 122A-D, receives the address of EADM AOB 230, accesses EADM AOB 230, and extracts ADM request block 232. SAPs 122A-D determine whether ADM request block 232 specifies a main-storage-clearing operation. ADM request block 232, is obtained from information contained in EADM AOB 230, and one or more MSBs 240A-N are designated, each MSB containing information for main-storage-clearing operations.

In step 310, after SAPs 122A-D determine that ADM request block 232 specifies a main-storage-clearing operation, SAPs 122A-D perform the actual main-storage-clearing operations, based on the specifications (i.e., address, size, etc.) in MSBs 240A-N associated with ADM request block 232. An interruption mechanism is provided to asynchronously notify the CPU when a SAP has successfully completed the main-storage-clearing operations. The interruption mechanism is also used to report unsuccessful operation completion due to errors in the request block or MSB format or memory access problems. The error type is specified in ADM response block 234. After an EADM start subchannel instruction signals the SAP to begin an EADM main-storage-clearing operation, processing of the operation by the SAP continues until complete, regardless of the number of MSBs and data blocks specified. If a SAP is only allowed a specified time period for task execution, partially completed instructions may be put on a queue by the SAP to continue the remaining task execution. A recovery scheme is also provided to ensure instruction completion by either restart or continuation, in the event of a SAP failure. In this exemplary embodiment, the SAP has the same architecture as the CPU on which operating systems and application programs execute, and performs memory clearing operations in a similar manner as a CPU-based clear (i.e., MVC, MVCL, etc.). In this manner, the CPU is free to perform other operations while the SAP executes the main storage clearing instructions.

Figure 3B:
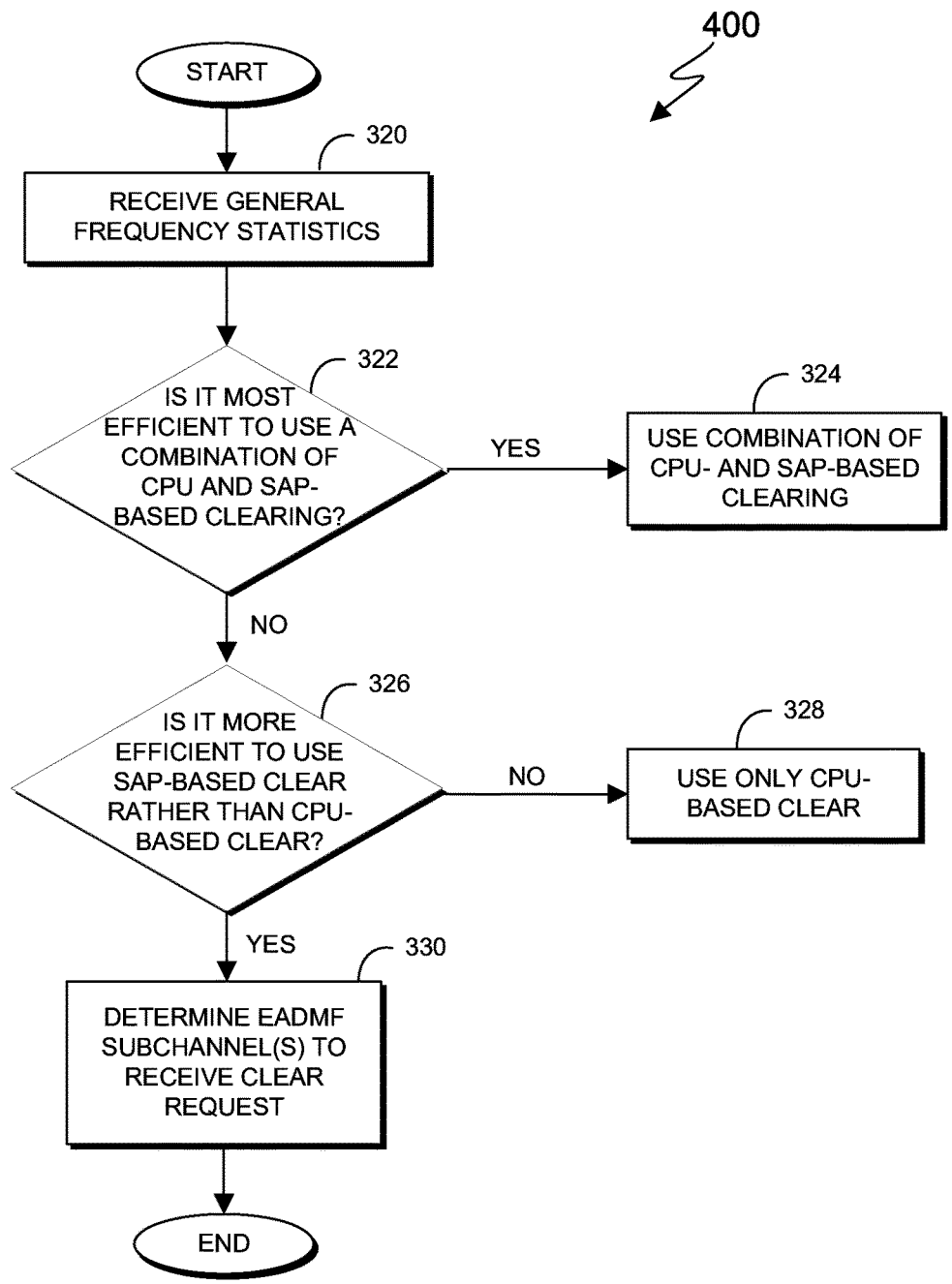
FIG. 3B depicts a flowchart illustrating operational steps for an operating system to monitor the main storage clearing operations of a system-assist processor (SAP), in accordance with an embodiment of the present invention.

FIG. 3B depicts flowchart 400 illustrating operational steps for an operating system, such as OS 134A, to monitor the main storage clearing operations of a SAP, in accordance with an embodiment of the present invention.

In step 320, the operating system receives general frequency statistics associated with the main-storage-clearing operations of SAPs 122A-D (FIG. 1). For example, the operating system may receive statistics such as the number of blocks cleared, the number of blocks to be cleared, the size of the blocks cleared, and the reason for clearing the specified blocks, among other information.

In step 322, the operating system determines whether it is most efficient to use a combination of CPU-based storage clearing operations and SAP-based storage clearing operations. The operating system determines whether using a combination of CPU and SAP storage clearing operations is most efficient by analyzing frequency statistics and metrics, such as latencies involved and the current workload in the CPU, among other data. If the operating system determines that it is most efficient to use a combination of CPU-based and SAP-based clearing operations, then, in step 324, the operating system continually analyzes the frequency statistics of the system to identify a breakpoint from the data, determining the point at which it is more effective to use the CPU for storage clearing instructions and at which point it is more effective to use the SAP-based main-storage-clearing operations. The operating system determines an EADMF subchannel(s) to receive the storage clear requests, based partially on which subchannel(s) are better able to distribute the storage clear requests.

If in step 322, the operating system determines that is not most efficient to use a combination of CPU-based and SAP-based clearing operations, then, in step 326, the operating system determines whether it is more efficient to use the SAP-based storage clearing operation rather than the CPU-based storage clearing operation. As described above, the operating system may analyze frequency data obtained, such as the current workloads on each processor, to determine whether a SAP-based storage clearing operation is more efficient than a CPU-based clear.

If in step 326, the operating system determines that it is more efficient to use a SAP-based storage clearing operation than a CPU-based storage clearing operation, then, in step 330, the operating system determines an EADMF subchannel(s) to receive the storage clear request(s). In this exemplary embodiment, the operating system monitors the EADMF main-storage-clearing operations and determines whether the operations are being effectively serviced on the designated subchannel(s). A different subchannel, or multiple subchannels, may be selected to handle the operation request if the operating system determines that the different subchannels are better able to distribute the request.

If in step 326, the operating system determines that it is not more efficient to use the SAP-based clearing operations rather than the CPU-based clearing operations, then, in step 328, only the CPU executes the storage clearing instructions.

The operating system will continually perform the operational steps of FIG. 3B to examine various metrics about the CPU-based and SAP-based storage clearing operations, and to ensure that the EADM main-storage-clearing operations are being executed in an optimized manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method in a data processing system comprising:
    determining, by a processor, from an instruction stream, an extended asynchronous data mover (EADM) start subchannel instruction;
    receiving, by the processor, a set of frequency statistics associated with main-storage-clearing operations, wherein the set of frequency statistics comprises:
        a quantity of blocks cleared,
        a quantity of blocks to be cleared, and
        a size of each of the blocks cleared,
    responsive to receiving the set of frequency statistics, determining, by the processor, whether to:
        use a computer processing unit (CPU) to clear the main storage block,
        use a combination of both the CPU and a system assist processor (SAP) to clear the main storage block, or
        offload the CPU memory cleaning operation to the SAP to clear the main storage block, wherein determining whether to offload the memory cleaning operation to the SAP comprises: analyzing the set of frequency statistics and metrics, and latencies of a current workload in the CPU;
    responsive to determining to offload the memory cleaning operation to the SAP, executing, by the processor, the EADM start subchannel instruction, wherein the executing comprises notifying the SAP;
    receiving, by the SAP, an asynchronous data mover (ADM) request block, wherein the ADM request block specifies a main-storage clearing operation command;
    obtaining one or more move specification blocks (MSBs), wherein an address associated with the one or more MSBs is designated by the ADM request block;
    determining, by the SAP, based on the one or more MSBs, an address and a size of a main storage block to clear;
    responsive to determining the address and the size of the main storage block, clearing, by the SAP, the main storage block; and
    responsive to determining, to use a combination of both the CPU and the SAP to clear the main storage block, continuously analyzing, by the processor, the set of frequency statistics to identify a breakpoint of when offload the memory cleaning operation to the SAP.

2. The method of claim 1, further comprising:
    receiving, by an operating system, results of the main-storage-clearing operation command;
    determining, by the processor, whether the main-storage-clearing operation command completed successfully; and
    responsive to determining that the main-storage-clearing operation command completed successfully, reporting one or more SAP resources used to complete the command.

3. The method of claim 2, further comprising:
    responsive to determining that the main-storage-clearing operation command did not complete successfully, providing an indication of an error associated with an MSB and an asynchronous-indirect-address-word (AIDAW).

4. The method of claim 1, wherein the main-storage-clearing operation command operates asynchronously from a program on a CPU.

5. The method of claim 1, further comprising:
    specifying, by the one or more MSBs, a first asynchronous-indirect-address-word (AIDAW) address;
    obtaining the first AIDAW address;
    determining, by one or more flags associated with an AIDAW, an address of a main storage block to clear, wherein a size of the main storage block to clear is determined by the one or more MSBs; and
    responsive to determining by the one or more flags associated with the AIDAW the address of the main storage block to clear, clearing the main storage block.

6. The method of claim 5, further comprising:
    determining, by the one or more flags associated with the first AIDAW address, a second AIDAW address; and
    responsive to determining the second AIDAW address, obtaining, one or more groupings of AIDAWs, wherein the one or more groupings of AIDAWs are linked.

7. The method of claim 1, wherein an operating system determines an extended asynchronous data mover facility (EADMF) subchannel to service the main-storage-clearing operation command, and wherein a determination of the EADMF subchannel is based, at least in part, on a workload associated with the EADMF subchannel.

8. A computer program product comprising:
    a computer readable storage medium and program instructions stored on the computer readable storage medium, the program instructions comprising:
    program instructions to determine, by a processor, from an instruction stream, an extended asynchronous data mover (EADM) start subchannel instruction;
    program instructions to receive a set of frequency statistics associated with main-storage-clearing operations, wherein the set of frequency statistics comprises:
        a quantity of blocks cleared,
        a quantity of blocks to be cleared, and
        a size of each of the blocks cleared,
    responsive to receiving the set of frequency statistics, program instructions to determine by the processor, whether to
        use a computer processing unit (CPU) to clear the main storage block,
        use a combination of both the CPU and a system assist processor (SAP) to clear the main storage block, or to offload the CPU memory cleaning operation to the SAP to clear the main storage block, wherein the program instructions to determine whether to offload the memory cleaning operation to the SAP comprises: program instructions to analyze the set of frequency statistics and metrics, and latencies of a current workload in the CPU;

responsive to determining to offload the memory cleaning operation to the SAP, program instructions to execute, by the processor, the EADM start subchannel instruction, the program instructions to execute comprising program instructions to notify the SAP;

program instructions to receive, by the SAP, an ADM request block, wherein the asynchronous data mover (ADM) request block specifies a main-storage clearing operation command;

program instructions to obtain one or more move specification blocks (MSBs), wherein an address associated with the one or more MSBs is designated by the ADM request block;

program instructions to determine, by the SAP, based on the one or more MSBs, an address and a size of a main storage block to clear;

responsive to determining the address and the size of the main storage block, program instructions to clear, by the SAP, the main storage block; and responsive to determining, to use a combination of both the CPU and the SAP to clear the main storage block, program instructions to continuously analyze, by the processor, the set of frequency statistics to identify a breakpoint of when offload the memory cleaning operation to the SAP.

9. The computer program product of claim 8, further comprising:

program instructions to receive, by an operating system, results of the main-storage-clearing operation command;

program instructions to determine, by the processor, whether the main-storage-clearing operation command completed successfully; and program instructions to, responsive to determining that the main-storage-clearing operation command completed successfully, report one or more SAP resources used to complete the command.

10. The computer program product of claim 9, further comprising:

program instructions to, responsive to determining that the main-storage-clearing operation command did not complete successfully, provide an indication of an error associated with an MSB and an asynchronous-indirect-address-word (AIDAW).

11. The computer program product of claim 8, wherein the main-storage-clearing operation command operates asynchronously from a program on a CPU.

12. The computer program product of claim 8, further comprising:

program instructions to specify, by the one or more MSBs, a first AIDAW address;

program instructions to obtain the first asynchronous-indirect-address-word (AIDAW) address;

program instructions to determine by one or more flags associated with an AIDAW, an address of a main storage block to clear, wherein a size of the main storage block to clear is determined by the one or more MSBs; and program instructions to, responsive to determining by the one or more flags associated with the AIDAW the address of the main storage block to clear, clear the main storage block.

13. The computer program product of claim 12, further comprising:

program instructions to determine, by one or more flags associated with the first AIDAW address, a second AIDAW address; and program instructions to, responsive to determining the second AIDAW address, obtain one or more groupings of AIDAWs, wherein the one or more groupings of AIDAWs are linked.

14. The computer program product of claim 8, wherein an operating system determines an extended asynchronous data mover facility (EADMF) subchannel to service the main-storage-clearing operation command, and wherein a determination of the EADMF subchannel is based, at least in part, on a workload associated with the EADMF subchannel.

15. A computer system comprising:

one or more computer processors;

one or more computer readable storage media;

program instructions stored on the one or more computer readable storage media for execution by at least one of the one or more processors, the program instructions comprising:

program instructions to determine, by a processor, from an instruction stream, an extended asynchronous data mover (EADM) start subchannel instruction;

program instructions to receive a set of frequency statistics associated with main-storage-clearing operations, wherein the set of frequency statistics comprises:

a quantity of blocks cleared, a quantity of blocks to be cleared, and a size of each of the blocks cleared, responsive to receiving the set of frequency statistics, program instructions to determine by the processor, whether to use a computer processing unit (CPU) to clear the main storage block, a combination of both the CPU and a system assist processor (SAP) to clear the main storage block, or offload the CPU memory cleaning operation to the SAP to clear the main storage block, wherein program instructions to determine whether to offload the memory cleaning operation to the SAP comprises: program instructions to analyze the set of frequency statistics and metrics, and latencies of a current workload in the CPU;

responsive to determining, to offload the memory cleaning operation to the SAP, program instructions to execute, by the processor, the EADM start subchannel instruction, the program instructions to execute comprising program instructions to notify the SAP;

program instructions to receive, by the SAP, an asynchronous data mover (ADM) request block, wherein the ADM request block specifies a main-storage clearing operation command;

program instructions to obtain one or more move specification blocks (MSBs), wherein an address associated with the one or more MSBs is designated by the ADM request block;

program instructions to determine, by the SAP, based on the one or more MSBs, an address and a size of a main storage block to clear;

responsive to determining the address and the size of the main storage block, program instructions to clear, by the SAP, the main storage block; and responsive to determining, to use a combination of both the CPU and the SAP to clear the main storage block, program instructions to continuously analyze, by the processor, the set of frequency statistics to identify a breakpoint of when offload the memory cleaning operation to the SAP.

16. The computer system of claim 15, further comprising:
program instructions to receive, by an operating system, results of the main-storage-clearing operation command;
program instructions to determine, by the processor, whether the main-storage-clearing operation command completed successfully; and
program instructions to, responsive to determining that the main-storage-clearing operation command completed successfully, report one or more SAP resources used to complete the command.

17. The computer system of claim 16, further comprising:
program instructions to, responsive to determining that the main-storage-clearing operation command did not complete successfully, provide an indication of an error associated with an MSB and an asynchronous-indirect-address-word (AIDAW).

18. The computer system of claim 15, further comprising:
program instructions to specify, by the one or more MSBs, a first asynchronous-indirect-address-word (AIDAW) address;
program instructions to obtain the first AIDAW address;
program instructions to determine by one or more flags associated with an AIDAW, an address of a main storage block to clear, wherein a size of the main storage block to clear is determined by the one or more MSBs; and
program instructions to, responsive to determining by the one or more flags associated with the AIDAW the address of the main storage block to clear, clear the main storage block.

19. The computer system of claim 18, further comprising:
program instructions to determine, by one or more flags associated with the first AIDAW address, a second AIDAW address; and
program instructions to, responsive to determining the second AIDAW address, obtain one or more groupings of AIDAWs, wherein the one or more groupings of AIDAWs are linked.

20. The computer system of claim 15, wherein an operating system determines an extended asynchronous data mover facility (EADMF) subchannel to service the main-storage-clearing operation command, and wherein a determination of the EADMF subchannel is based, at least in part, on a workload associated with the EADMF subchannel.

* * * * *